April 30, 1968 A. SMITH ET AL 3,380,235
MECHANICAL FRUIT PICKER
Filed July 2, 1965 3 Sheets-Sheet 1
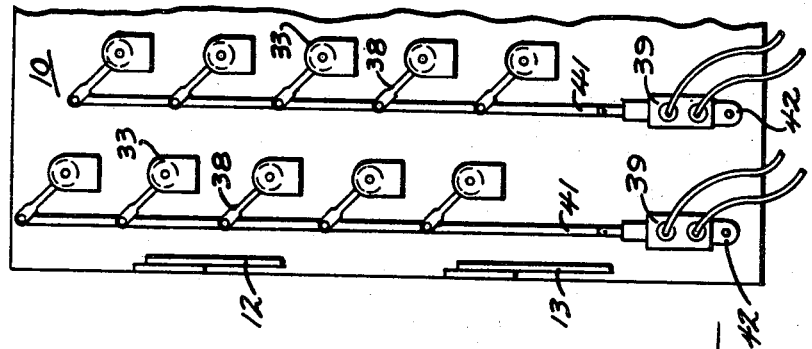
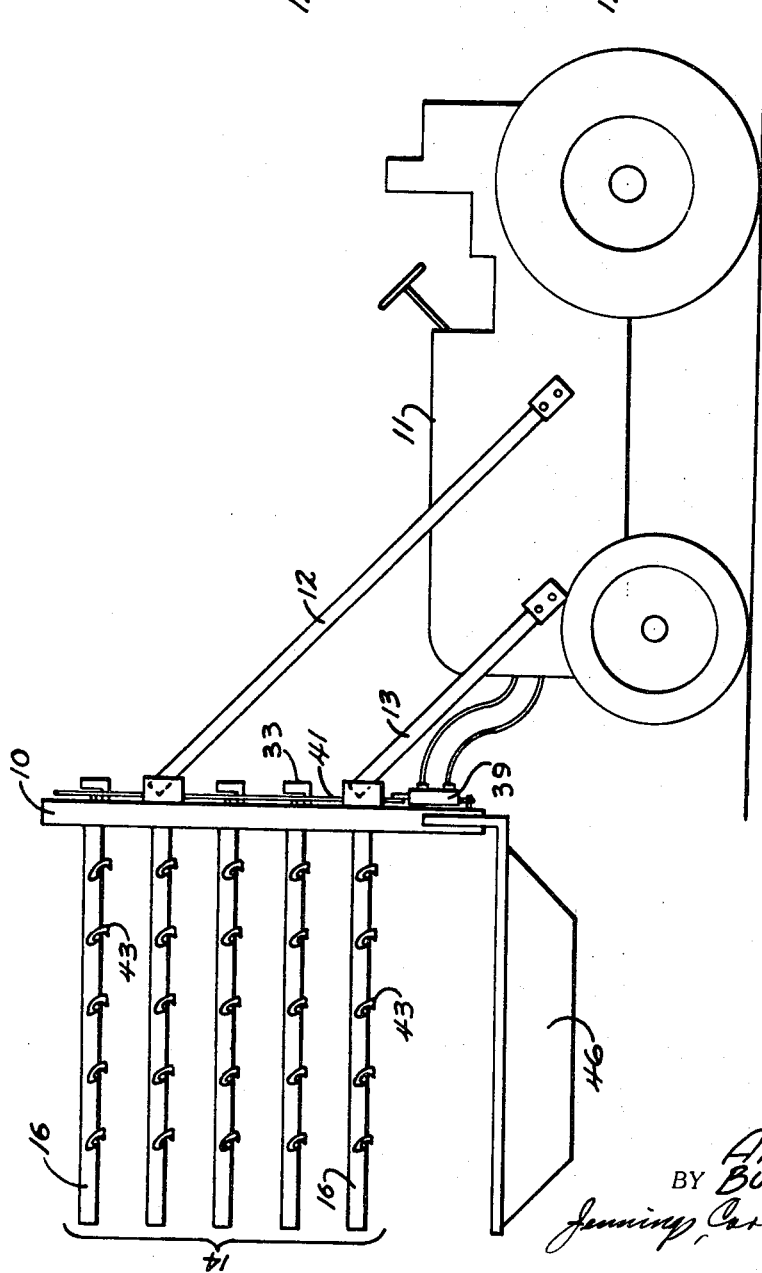
INVENTOR.
Alexander Smith
BY Burton D. Baggs, Jr.
Jennings, Carter & Thompson
Attorneys April 30, 1968 A. SMITH ET AL 3,380,235
MECHANICAL FRUIT PICKER
Filed July 2, 1965
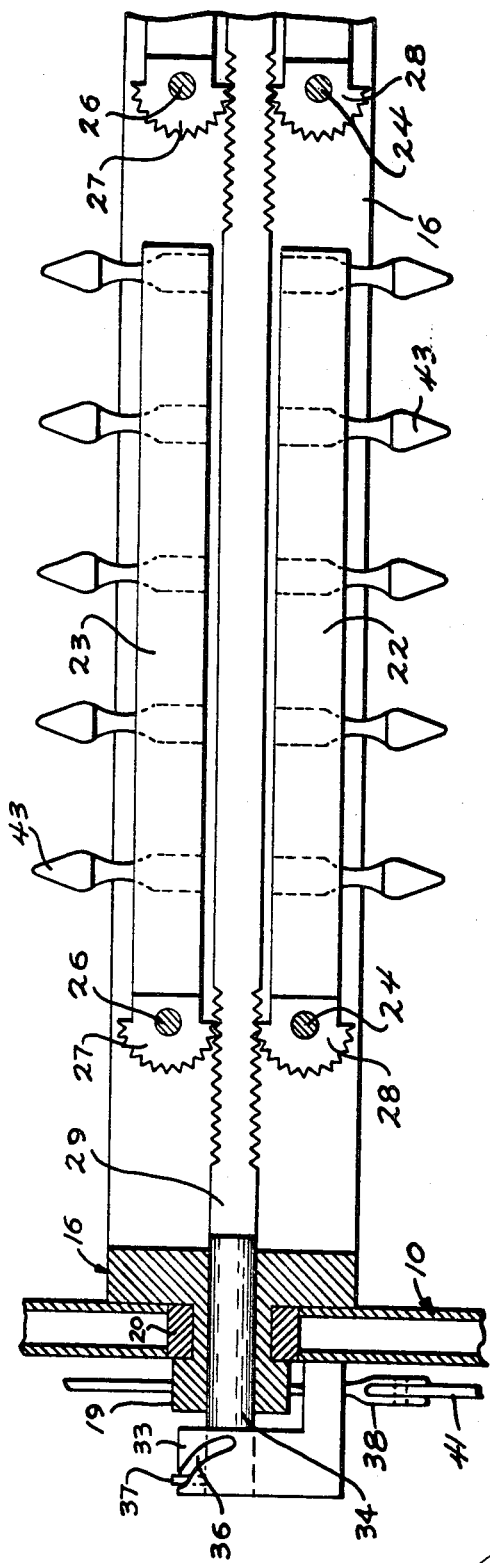
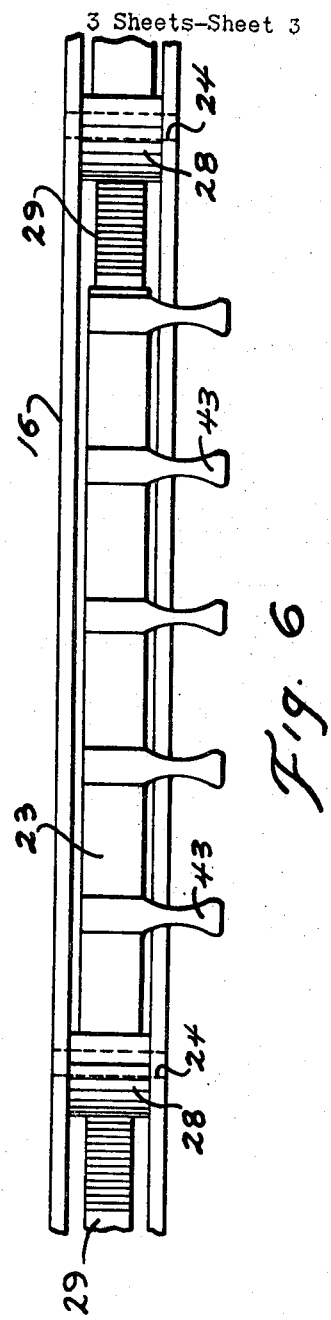
INVENTOR.
Alexander Smith
Burton D Baggs, Jr
Jennings, Carter & Thompson
Attorneys United States Patent Office 3,380,235
Patented Apr. 30, 1968

3,380,235
MECHANICAL FRUIT PICKER
Alexander Smith and Burton D. Baggs, Jr., both of
Box 1763, Sanford, Fla. 32771
Filed July 2, 1965, Ser. No. 469,202
9 Claims. (Cl. 56—328)

ABSTRACT OF THE DISCLOSURE

A mechanical fruit picker embodying a multiplicity of picker bars mounted horizontally on a panel with means to insert and retract the bars among the branches of a tree. Each picker bar has pivotally mounted thereon a plurality of retractile picker arms. Means are provided to extend the picker arms to fruit engaging position when retracting the picker bars and to move them to positions parallel to the picker bars when inserting the picker bars among the branches of the tree. Each picker arm is provided with a plurality of picker fingers to engage the fruit when the picker bars are being withdrawn. Suitable means are provided to operate the panel with its multiplicity of picker bars and picker arms.

---

This invention relates to apparatus for picking fruit, particularly citrus fruit. Many attempts have been made by various persons and groups to devise a mechanical fruit picker, but so far none with which we are familiar has been commercially successful. The difficulties heretofore encountered have consisted principally in the difficulty of getting the major portion of the fruit and in injury to the trees and the fruit by the mechanisms employed.

The principal object of our invention, therefore, is to provide a mechanical fruit picker which shall be effective in picking the major portion of the fruit on a tree without material damage to the branches of the tree, and without injury to the fruit.

A further object of our invention is to provide a mechanical fruit picker which shall be adapted to engage the fruit on the branches of a tree and separate it from the branches by pulling it at an angle to its stem, as distinguished from a direct pull.

A still further object of our invention is to provide a mechanical fruit picker which shall embody a multiplicity of horizontal picker bars each having a plurality of retractile picker arms mounted thereon with picker fingers on the arms together with means to insert the horizontal bars among the branches of a tree with the picker arms withdrawn and to entend the arms to fruit engaging position before the picker arms are withdrawn from the tree.

Briefly our invention embodies a vertically disposed panel having a multiplicity of horizontally extending spaced apart picker bars mounted in the panel. A plurality of retractile picker arms are pivotally mounted on each of the picker bars. Means are provided to extend the arms to fruit engaging position, substantially normal to the bars, and to retract them to lie substantially parallel with the picker bars so that the picker bars may be inserted among the branches of a tree without injury to the tree and withdrawn to engage and pick the fruit without injury to the fruit.

On each of the picker arms are a plurality of picker fingers which extend rearwardly and are inclined downwardly with respect to the picker arms when in fruit picking position. As the bars are withdrawn from the branches of a tree, the picker arms engage the fruit with the stems passing between the picker fingers. The picker fingers engage the fruit and turn it under the picker arms as the arms are withdrawn so that the fruit is pulled with the stem at substantially a right angle to the direction of pull. Suitable means are provided whereby to operate the panel with its multiplicity of bars and picker arms as will be more particularly described hereinafter.

Apparatus embodying features of our invention is illustrated in the accompanying drawings, forming a part of this application in which FIG. 1 is an elevational view, in part diagrammatic, showing our improved picking apparatus mounted on a utility tractor;

FIG. 2 is a partial rear elevation of the panel showing the operating means for the picker arms;

FIG. 5 is a detail side view of a portion of one of the horizontal bars with the picker arms in retracted position and with the cover portion of the arm removed;

FIG. 6 is a detail top plan view of one of the horizontal bars with the picker arms in retracted position.

Figure 3:
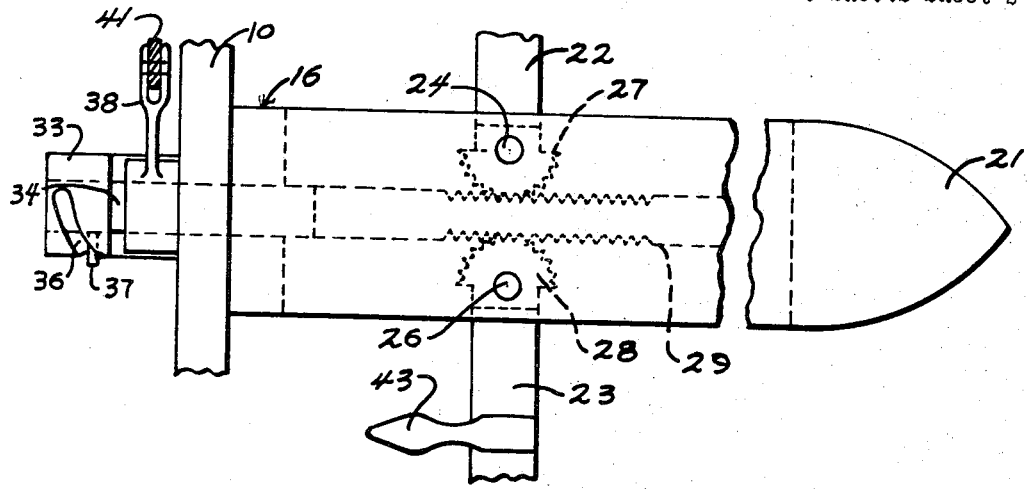
FIG. 3 is a partial top plan view of one of the horizontal picker bars carrying the picker arms with the picker arms in extended position.

Referring now to the drawings for a better understanding of our invention, we show, in FIGS. 1 and 2, a panel 10 which may be either solid or fabricated. The panel 10 may be mounted for manipulation in the manner described, in any suitable manner. For the purpose of illustration we show it supported from a utility tractor 11 by means of rigid braces 12 and 13. Mounted in the panel and extending forwardly therefrom are a multiplicity of vertical rows 14 of picker bars 16, each of the bars being of a length to extend among the branches of a tree beyond the fruit bearing areas. The picker bars in alternate vertical rows are staggered vertically relative to adjacent rows as indicated in FIG. 2 of the drawings.

Preferably each of the picker bars is comprised of an upper plate portion 17 and a lower plate portion 18, spaced from the upper portion and both joined to a hub portion 19 which extends through, and is rotatable in a suitable bearing 20 in the panel 10. The forward end 21 of each picker bar is pointed whereby it may be inserted among the branches of a tree without damage to the tree.

Mounted between the upper and lower plate portions 17 and 18 of each picker bar are a plurality of picker arms 22 and 23, only four being shown partially in FIG. 5 of the drawing. It will be understood that the picker bars 16 shall be of a sufficient length to protrude among the branches of a tree beyond the fruit bearing area and that picker arms shall be mounted as shown from end to end of the picker bars. The picker arms 22 and 23 are mounted for rotation about pivot pins 24 and 26 and are preferably offset to lie in different planes. The arms are provided, on their inner ends, with semicircular pinions 27 and 28.

Mounted in each of the picker bars, between the ends of the picker arms, is a rack 29 having teeth meshing with the teeth on the pinions 27 and 28. The rack 29 is reciprocable and it will be seen from FIG. 3 of the drawing that when the rack 29 is moved forward, the picker arms are caused to move outwardly to fruit picking position, and when the rack is moved rearwardly the picker arms are retracted to the position shown in FIGS. 4 and 5.

Figure 4:
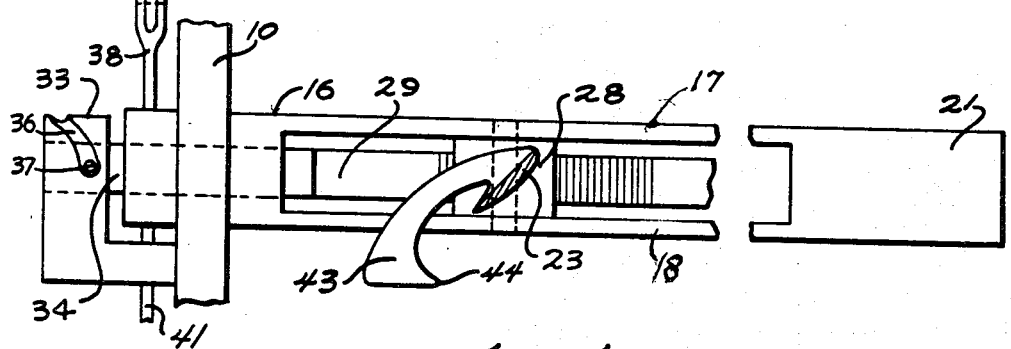
FIG. 4 is a detail side view of a portion of one of the horizontal bars, partly in section, with the picker arm shown in extended, fruit picking position.

It will be seen by consideration of FIGS. 4 and 5 that the picker bars are wider in one dimension than the other. When the picker arms are in retracted position and are being inserted among the branches of a tree, the bars are turned to present the wider dimension in a vertical plane. When the bars are being withdrawn from the branches of a tree, the bar is turned 90° to present its wider dimension in a horizontal plane and the picker arms 22 and 23 are extended to fruit picking position. This movement will now be described.

Fixedly mounted on the outer side of the panel 10, opposite the end fo each picker bar, is a bracket 33 through which the hub portion 19 of the picker bar extends. The end portion 34 of the rack 29 extends through the hub portion. Formed in the bracket 33 is an inclined slot 36. A pin 37 carried by the end portion 34 of the rack rides in the slot. A crank arm 38 on the outer end of the hub portion 19 of the picker bar provides means to rotate it through an angle of 90°.

It will be seen that when the picker bar 16 is rotated to the position shown in FIG. 5, the pin 37 moves to the outer end of the slot 36 and moves the rack 29 rearwardly to move the picker arms 22 and 23 to retracted position. When the picker bar 16 is rotated to the position shown in FIG. 4, the pin 37 moves to the forward end of the slot 36, moving the rack 29 forward and causing the picker arms 22 and 23 to be extended to fruit picking position.

All the picker bars 16 in each vertical row are rotated in unison by means of a hydraulic cylinder 39 which is connected to all the crank arms 38 in the row by means of a link 41. To compensate for angular motion of the cranks 38 the cylinder 39 is pivotally mounted on the panel 10 at 42. The cylinder 39 is provided with hydraulic pressure from the usual hydraulic system provided on utility tractors. It will be understood that pressure is admitted to, and exhausted from the cylinders 39 by well known means, not shown.

Figure 7:
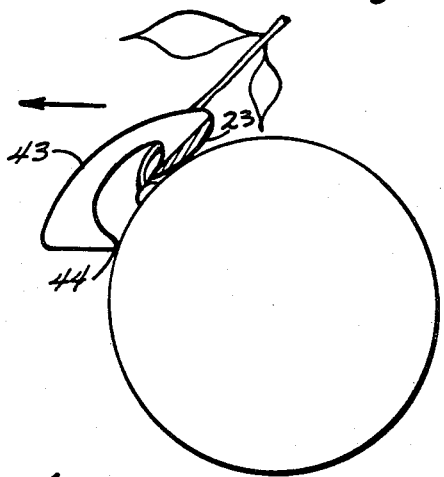
FIG. 7 is a detail view illustrating the manner in which fruit is separated from its stem by our improved picker.

A very important feature of our invention is in the design of the picker arms with their accompanying picker fingers. Each of the picker arms is relatively flat and when in extended, picking position, as shown for the arm 23 in FIGS. 4 and 7, is downwardly and rearwardly inclined as viewed in cross section. Mounted on each of the picker arms are a plurality of picker fingers 43 which, when the arm is extended to picking position, project rearwardly and downwardly, as shown in FIG. 4. Each of the fingers 43 curves downwardly through an angle of approximately 90°, and terminates in a rounded nose portion 44 with an under surface substantially horizontal. The fingers are spaced apart on the picker arm a distance less than the diameter of the fruit to be picked. We have found that a distance of 1⅝" is satisfactory in picking oranges and grapefruit.

Referring to FIG. 7, when the picker bar 16 with its picker arms 22 and 23, is being withdrawn from the branches of a tree, the stems of the fruit are drawn between the picker fingers 43. As the movement continues the fruit is engaged by the nose portions 44 of the picker fingers and is caused to turn back under the picker arm 23 to a position where the stem is attached to the fruit, it is at an angle of approximately 90° to the direction of movement of the picker arm as indicated by the arrow. In this way the stem is broken off from the fruit in the same manner fruit is picked by human hands. The fruit falls into a suitable receptacle 46, mounted on the lower end of the panel 10.

As is well known, citrus fruit, particularly oranges, hang down on relatively long stems at the outer end portions of the branches of the trees. More than 95% of the fruit on a tree is found within eighteen inches of the outer limits of the branches.

From the foregoing description the operation of our improved fruit picker will be readily understood. The panel 10, with its picker bars 16 is moved forward by the tractor to insert the bars among the branches of a tree beyond the fruit bearing area with the picker arms 22 and 23 retracted. The picker arms are then rotated by means of the hydraulic cylinders 39 to extend the picker arms, with their picker fingers, to fruit picking position. The picker bars are then withdrawn from the tree, the fruit is engaged by the picker arms and the picker fingers, is separated from its stems, and falls into the receptacle 46. It will be understood that the picker bars 16 and picker arms 22 and 23 are of such length and are so spaced as to contact all the fruit in the area in which the picker bars are inserted and withdrawn. As the picker bars are inserted among the branches of a tree the wider dimensions of the bars lie in a vertical plane to minimize any probability of damage to the branches.

As many apparently widely different embodiments of this invention may be made without departing from the spirit and scope thereof, it is to be understood that the invention is not limited to the specific embodiments hereinbefore described except as defined in the appended claims.

What we claim is:
1. A mechanical fruit picker comprising
   (a) a multiplicity of picker bars,
   (b) retractile picker arms mounted on the picker bars,
   (c) means to extend the picker arms to positions normal to the picker bars and to retract them to lie substantially parallel with the picker bars,
   (d) picker fingers mounted on the arms to project rearwardly in fruit engaging position when the arms are extended, and
   (e) means to insert the picker bars among the branches of a tree and to withdraw them therefrom.
2. A mechanical fruit picker comprising
   (a) a vertically disposed panel,
   (b) a multiplicity of horizontally extending spaced apart picker bars mounted in the panel,
   (c) a plurality of picker arms pivotally mounted on each of the picker bars,
   (d) means to extend the picker arms to positions normal to the picker bars and to retract them to lie substantially parallel with the picker bars,
   (e) a plurality of picker fingers mounted on each of the picker arms to project rearwardly in fruit engaging position when the arms are extended, and
   (f) means to insert the picker bars among the branches of a tree with the picker arms retracted and to withdraw the bars therefrom with the picker arms extended.
3. A mechanical fruit picker as defined in claim 2 in which each of the picker arms is comprised of a relatively flat bar downwardly inclined rearwardly when in fruit picking position and in which the picker fingers are mounted on the bars to extend rearwardly and downwardly when in fruit picking position.
4. In a mechanical fruit picker,
   (a) a horizontal picker bar,
   (b) retractile picker arms mounted on the picker bar,
   (c) a plurality of picker fingers mounted on each picker arm and spaced apart a distance less than the diameter of the fruit to be picked,
   (d) means to retract the picker arms to lie approximately parallel to the picker bar and to extend them to fruit picking position approximately normal to the picker bar, and
   (e) means to insert the horizontal picker bar among the branches of a tree with the picker arms retracted and to withdraw it therefrom with the picker arms extended.
5. Apparatus as defined in claim 4 in which
   (a) the picker arm is comprised of a relatively flat bar downwardly inclined when in fruit picking position, and
   (b) each of the picker fingers is curved rearwardly through an angle of roughly 90° to the picker arm and terminates in a rounded nose portion.
6. Apparatus as defined in claim 4 in which the picker bar is wider in one dimension than the other, and in which the bar is inserted among the branches of a tree with the wider dimension lying in a vertical plane.
7. In a mechanical fruit picker,

(a) a picker bar comprised of upper and lower plate members,
(b) a plurality of picker arms pivotally mounted in the picker bar between the upper and lower plate members, said picker arms being arranged in pairs with inner ends in opposed relation,
(c) a pinion on the inner end of each picker arm,
(d) a rack extending through the picker bar with its teeth meshing with the pinions on the picker arms,
(e) and means to reciprocate the rack to extend and retract the picker arms.

8. In a mechanical fruit picker,
(a) a picker bar comprised of upper and lower plate members,
(b) a plurality of picker arms pivotally mounted in the picker bar between the upper and lower plate members, said picker arms being arranged in pairs with inner ends in opposed relation,
(c) a pinion on the inner end of each picker arm,
(d) a rack extending through the picker bar with its teeth meshing with the pinions on the picker arms,
(e) a panel supporting the picker bar,
(f) a hub portion on the picker bar extending through and journaled in the panel,
(g) a bracket fixedly mounted on the panel and having an angular slot therein, the outer end of the rack extending through the hub portion of the picker bar and the bracket,
(h) a pin on the outer end of the rack extending into the slot in the bracket, and
(i) means to rotate the picker bar a limited distance to cause the pin on the rack to move through the slot and reciprocate the rack to move the picker arms to retracted and extended positions.

9. Apparatus as defined in claim 8 embodying a multiplicity of picker bars, and means to rotate all the bars in unison.

References Cited

UNITED STATES PATENTS

| | | | |
|---|---|---|---|
| 901,373 | 10/1908 | Raymond | 56—330 |
| 1,360,473 | 11/1920 | Turner et al. | 56—330 |
| 2,696,706 | 12/1954 | Getsinger | 56—330 |
| 3,040,507 | 6/1962 | Lasswell | 56—328 |
| 3,129,551 | 4/1964 | Lasswell | 56—328 |
| 3,143,844 | 8/1964 | Polk | 56—328 |
| 3,153,311 | 10/1964 | Pool | 56—328 |

RUSSELL R. KINSEY, *Primary Examiner.*